US008302928B2

(12) United States Patent
Asakura et al.

(10) Patent No.: US 8,302,928 B2
(45) Date of Patent: Nov. 6, 2012

(54) CUSHIONING MEMBER, SHOCK PROTECTION DEVICE, AND PORTABLE INFORMATION EQUIPMENT USING THE SAME

(75) Inventors: Hirofumi Asakura, Osaka (JP); Katsutoshi Yuasa, Osaka (JP); Tetsuya Kawamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1190 days.

(21) Appl. No.: 11/926,496

(22) Filed: Oct. 29, 2007

(65) Prior Publication Data

US 2008/0151421 A1 Jun. 26, 2008

(30) Foreign Application Priority Data

Dec. 20, 2006 (JP) .................... 2006-342163
Apr. 24, 2007 (JP) .................... 2007-113723

(51) Int. Cl.
*F16M 13/00* (2006.01)
(52) U.S. Cl. ............... 248/548; 248/636; 361/679.34; 361/679.36
(58) Field of Classification Search ......... 248/548, 248/636, 637, 638; 361/679.34, 679.36
See application file for complete search history.

(56) References Cited

U.S. PATENT DOCUMENTS

| | | | | |
|---|---|---|---|---|
| 3,529,102 A | * | 9/1970 | Rosenstand | 381/324 |
| 4,611,782 A | * | 9/1986 | Ushijima et al. | 267/140.13 |
| 5,065,555 A | * | 11/1991 | Kobori et al. | 52/167.7 |
| 5,110,660 A | * | 5/1992 | Wolf et al. | 428/178 |
| 5,201,489 A | * | 4/1993 | Wolf et al. | 248/638 |
| 5,264,259 A | * | 11/1993 | Satoh et al. | 428/34.5 |
| 5,370,411 A | | 12/1994 | Takamiya et al. | |
| 6,024,338 A | * | 2/2000 | Koike et al. | 248/638 |
| 6,138,980 A | * | 10/2000 | Farbotnik | 248/638 |
| 6,320,122 B1 | * | 11/2001 | Dickey et al. | 174/359 |
| 6,543,741 B1 | * | 4/2003 | Li et al. | 248/638 |
| 6,830,793 B2 | * | 12/2004 | Hawkins et al. | 428/36.9 |
| 6,858,794 B2 | * | 2/2005 | Jensen et al. | 174/355 |
| 6,912,866 B2 | * | 7/2005 | Seo et al. | 62/295 |
| 7,167,360 B2 | * | 1/2007 | Inoue et al. | 361/679.34 |
| 7,684,183 B2 | * | 3/2010 | Mori et al. | 361/679.36 |
| 2003/0016493 A1 | * | 1/2003 | Hiratomo et al. | 361/685 |
| 2004/0124572 A1 | * | 7/2004 | Tamada et al. | 267/136 |

FOREIGN PATENT DOCUMENTS

| | | |
|---|---|---|
| JP | 63-164478 U | 10/1988 |
| JP | 05-319347 A | 12/1993 |
| JP | 10-141408 A | 5/1998 |
| JP | 2005-256982 A | 9/2005 |

* cited by examiner

*Primary Examiner* — Bradley Duckworth
(74) *Attorney, Agent, or Firm* — RatnerPrestia

(57) ABSTRACT

A cushioning member includes a first plane, an opening opened to the first plane, and an air storage for storing air formed from the opening to an inside of the cushioning member. When a shock load is imposed on the cushioning member, the air in the air storage is compressed, and the first plane is deformed by the pressure of the compressed air to form a gap. A part of the compressed air flows out of the air storage through the gap. This structure provides a high shock-cushioning effect.

12 Claims, 15 Drawing Sheets

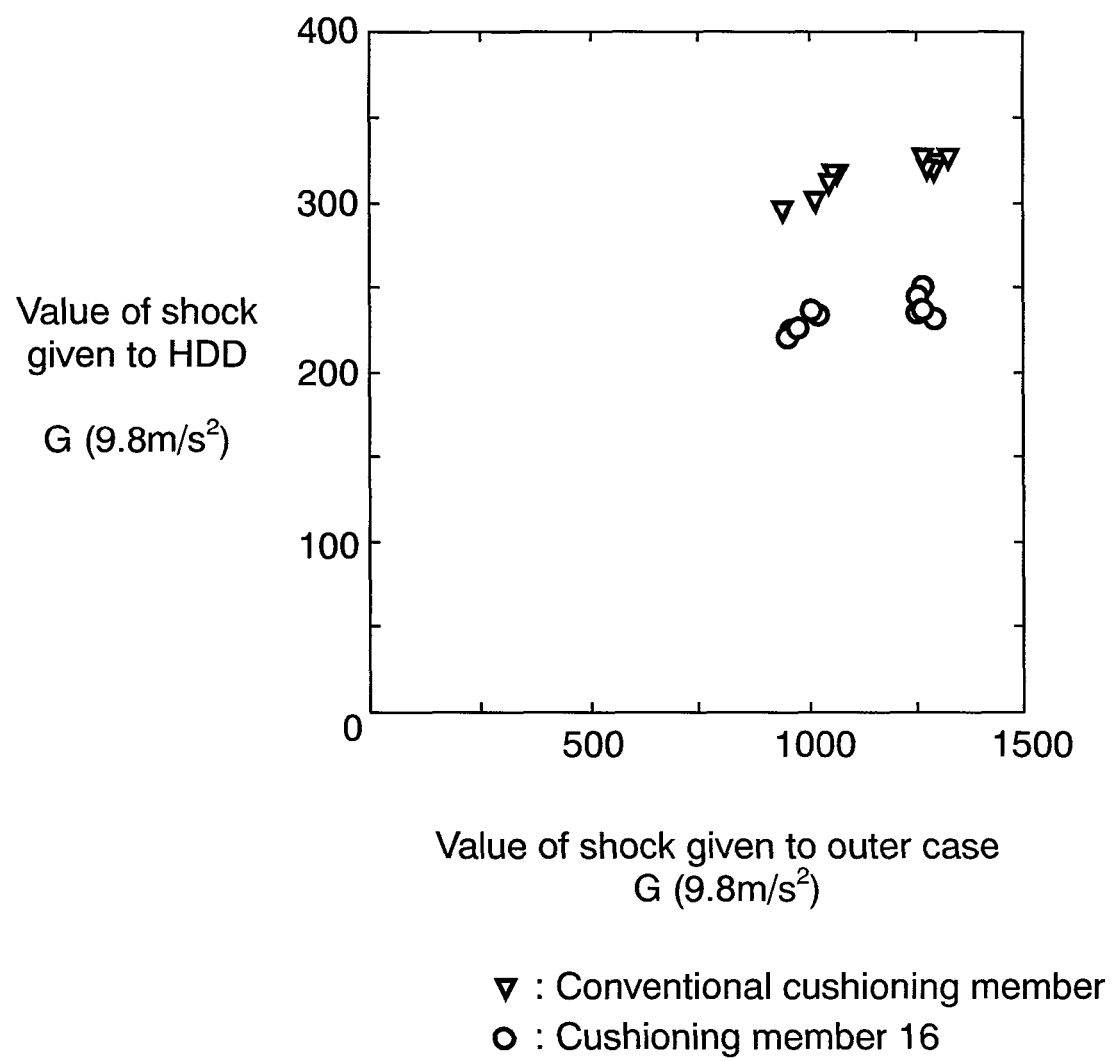

CUSHIONING MEMBER, SHOCK PROTECTION DEVICE, AND PORTABLE INFORMATION EQUIPMENT USING THE SAME

BACKGROUND OF THE INVENTION

1. Field of the Invention

The present invention relates to a cushioning member for protecting a device to be protected from shock, e.g. a hard disk drive, to a shock protection device including the cushioning members, and to portable information equipment incorporating the shock protection device.

2. Background Art

A hard disk drive (hereinafter referred to as a HDD) includes a disk rotating at high speeds, and a magnetic head. In the HDD, the magnetic head is moved in a head load state in which a predetermined spacing distance is provided from a disk surface of the disk and data is recorded into or reproduced from an intended recording position on the disk surface. To increase the recording density of the HDD, the amount of spacing provided when the magnetic head floats from the disk surface tends to be decreased year by year.

For this reason, especially when a shock load is imposed on the disk surface in the direction perpendicular thereto during operation of the HDD, the magnetic head is displaced in an amount larger than the spacing and likely to hit the disk surface. This phenomenon is called a head slap. Generally, the head slap can cause physical damage to the recording surface of the disk or the head. When the recording surface of the disk is damaged, data cannot be recorded into or reproduced from the damaged portion of the disk. In the worst case, all the recording surface of the disk cannot be used, that is, the HDD is broken.

When a HDD is incorporated and used in stationary information equipment represented by a desktop computer, a shock load causing the head slap is hardly imposed thereon. In contrast, a HDD incorporated in portable information equipment represented by a notebook personal computer (hereinafter a notebook PC) is always exposed to a shock load causing the head slap. In other words, a notebook PC features being carried and moved. A user thereof can carry and move the notebook PC easily. However, the user easily hits the notebook PC on a hard object, such as a corner of a desk, or drops the notebook PC inadvertently. A notebook PC is made light-weight and compact to ensure portability thereof. Because of this structure, a shock load causing the head slap can easily be transferred to the HDD incorporated in the notebook PC. As a result, the HDD may be broken.

In recent years, a small HDD to be incorporated into the notebook PC has a head retracting capability to increase shock resistance especially during operation. For a 2.5-inch HDD, for example, the magnetic head is retracted in a position spaced from the disk in an idling state, i.e. no access request for a predetermined period, irrespective of whether the HDD is in operation or not. For the retraction of the magnetic head, the magnetic head is moved into a retracting member that is disposed in a position spaced from the disk. In other words, the magnetic head is moved in a retracted position. Further, the magnetic head is locked in the retracted position. Such head retracting operation and locking operation is called head unloading operation. In this manner, the head unloading operation avoids the physical damage to the magnetic head or the disk surface that is caused by a shock load imposed on the recording surface of the disk in the direction perpendicular thereto.

In other words, as an operation mode, when the magnetic head need not be positioned on the recording surface of the disk, the head is retracted from the disk to prevent occurrence of the head slap.

While the magnetic head is accessing the disk (during operation of the HDD), the magnetic head is in a head load state. Therefore, when a shock load is imposed on the HDD in the direction perpendicular thereto during operation of the HDD, there is still high possibility of occurrence of the head slap and damage to the disk. For this reason, the head retracting capability is not effective in the HDD shock resistance when the user thereof inadvertently hits the notebook PC to the hard object or drops the notebook PC during operation of the HDD.

Further, the magnetic head or the disk surface can be damaged by small shock loads or frequently repeated vibrations daily applied to the HDD. The impact loads imposed daily include impact loads imposed when the notebook PC is placed on a desk, or carried in a bag.

FIG. 13A is a perspective view of notebook PC 110 incorporating conventional shock protection device 114 for hard disk drive 113 (hereinafter HDD 113). FIG. 13B is a perspective view of HDD 113 and shock protection device 114 of FIG. 13A. FIG. 13C is a perspective view of shock protection device 114 of FIG. 13A. FIG. 13D is a perspective view of shock protection device 114 of FIG. 13A. FIG. 14A is a perspective view of cushioning member 116 for use in shock protection device 114 of FIG. 13D. FIG. 14B is a sectional view showing a section taken on plane 14B of cushioning member 116 of FIG. 14A. FIG. 14C is a partially sectional view showing a section taken on plane 14C of shock protection device 114 of FIG. 13D.

As shown from FIGS. 13A through 14C, notebook PC 110 includes notebook PC body 111 and display 112. Notebook PC body 111 has some circuits including information processing circuits (not shown) therein. Display 112 has a liquid crystal panel (not shown) and some circuits including liquid crystal display circuits (not shown) therein. HDD 113 is covered by shock protection device 114 and housed in notebook PC 110. Shock protection device 114 includes inner case 114a and outer case 114b.

Inner case 114a is made of packaging material 115 and cushioning members 116. Packaging material 115 is made of a thin sheet material of resin. For packaging material 115, the sheet material is cut, bent, and formed into a shape having a space therein. Housed in an inside space of packaging material 115 is a device susceptible to a shock load, such as HDD 13. Cushioning members 116 are attached to packaging material 115 by double-sided adhesive tapes. Cushioning members 116 include upper cushioning members 116u, lower cushioning members 116d, and side cushioning members 116s. Each of cushioning members 116 is a flexible material that is shaped like substantially a rectangular parallelepiped and has cushioning performance of undergoing compression deformation when being depressed. The materials of cushioning members 116 include special rubber, and foamed material, such as polyurethane foam. Both inner case 114a and HDD 113 are housed in outer case 114b. Outer case 114b is a box made of a metal, such as aluminum.

Shock protection device 114 thus structured houses a device susceptible to a shock load, such as HDD 13, and is incorporated in notebook PC body 111. With this structure, HDD 13 is protected from an extremely large shock load caused by a drop or the like. Further, HDD 13 is protected from small shock loads caused by daily actions, or frequently repeated vibrations.

SUMMARY OF THE INVENTION

A cushioning member of the present invention includes a first plane, an opening opened to the first plane, and an air storage for storing air formed from the opening to an inside of the cushioning member. When a shock load is imposed on the cushioning member, the air in the air storage is compressed, and the first plane is deformed by the pressure of the compressed air to form a gap. A part of the compressed air flows out of the air storage through the gap. This structure provides a cushioning member capable of exerting a high shock-cushioning effect.

A shock protection device of the present invention includes a packaging material, a cushioning member, and a case member. The packaging material is made of a sheet material and houses a device to be protected from shock in a space formed by the sheet material. The cushioning member is disposed on the packaging material in contact therewith, and shrinks to protect the device to be protected from shock. The cushioning member includes a first plane, an opening opened to the first plane, and an air storage for storing air formed from the opening to an inside of the cushioning member. The case member houses the device to be protected from shock, the packaging material, and the cushioning member. Intimate contact of the case member with the first plane blocks the opening. Further, when a shock load is imposed on the shock protection device, the air in the air storage is compressed, and the pressure of the compressed air forms a gap in a contact portion between the first plane and the case member. A part of the compressed air flows out of the air storage through the gap. This structure provides a shock protection device capable of exerting a high shock-cushioning effect.

BRIEF DESCRIPTION OF THE DRAWINGS

FIG. 4 is a graph showing measurement data on a shock load borne by a HDD resulting from a shock load imposed on an outer case thereof.

DETAILED DESCRIPTION OF THE INVENTION

Hereinafter, descriptions are provided of exemplary embodiments of the present invention, with reference to the accompanying drawings.

First Exemplary Embodiment

Figure 1A:
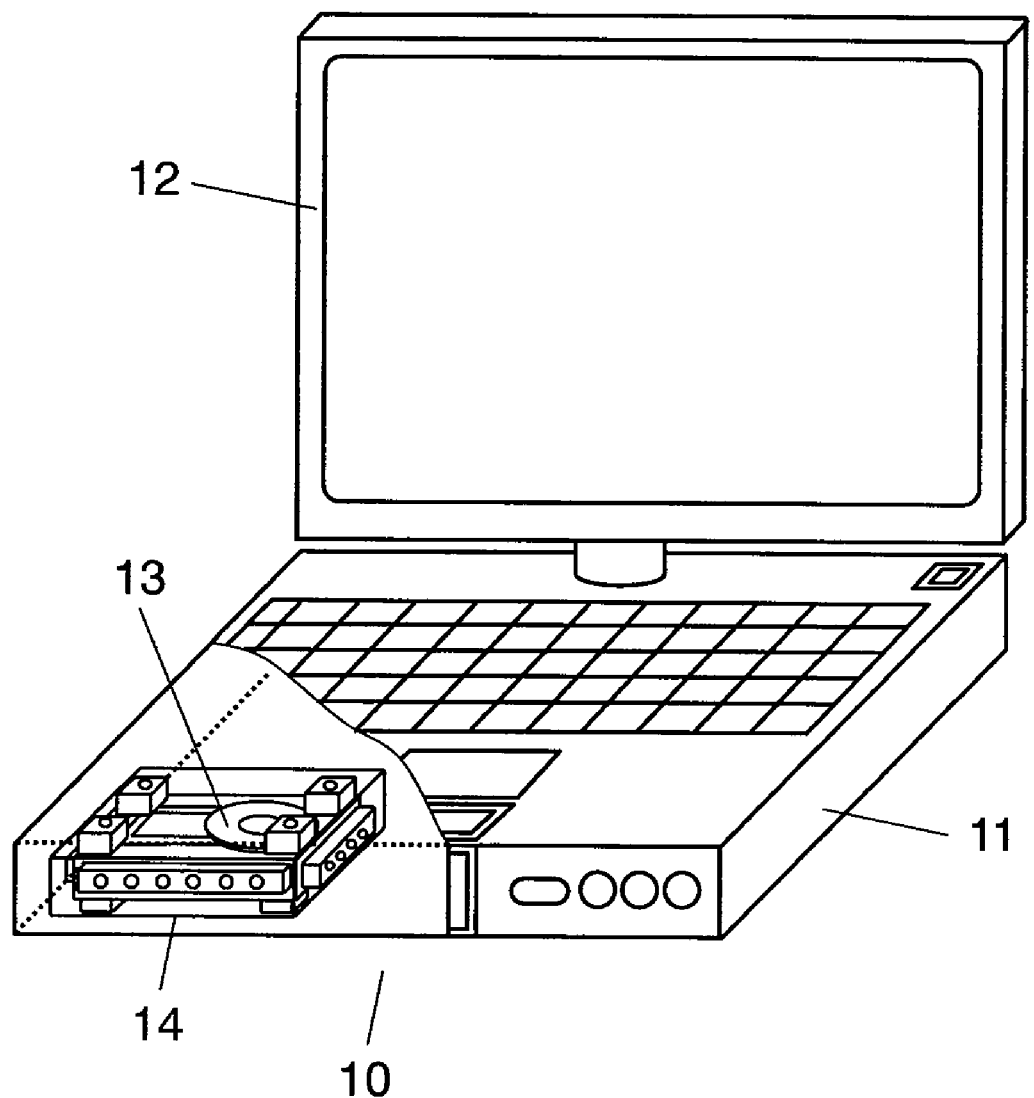
FIG. 1A is a perspective view of a notebook personal computer (PC) incorporating a shock protection device for a hard disk drive (HDD) in accordance with a first exemplary embodiment of the present invention.
Figure 1B:
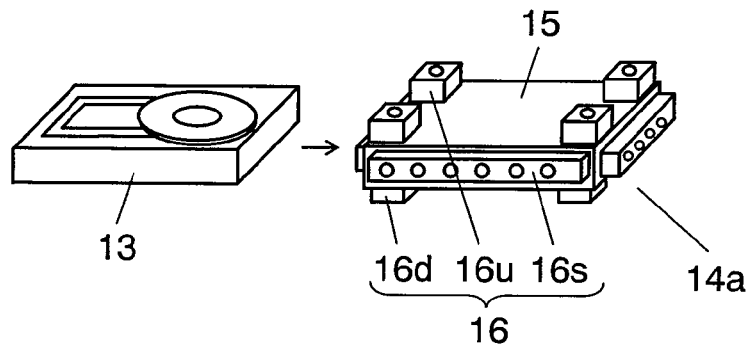
FIG. 1B is a perspective view of the HDD and the shock protection device of FIG. 1A.
Figure 1C:
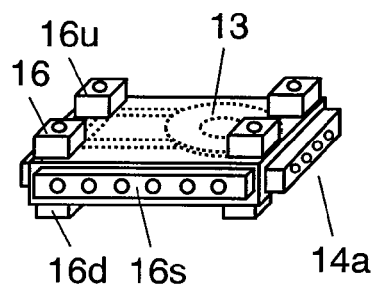
FIG. 1C is a perspective view of the shock protection device of FIG. 1A.
Figure 1D:
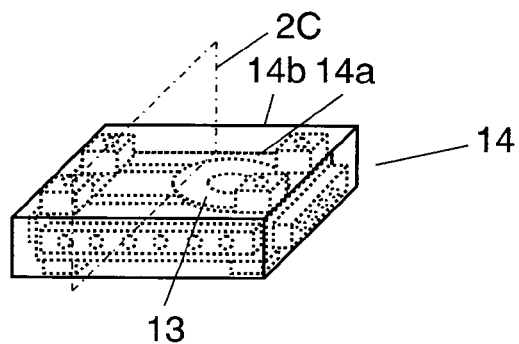
FIG. 1D is a perspective view of the shock protection device of FIG. 1A.
Figure 2A:
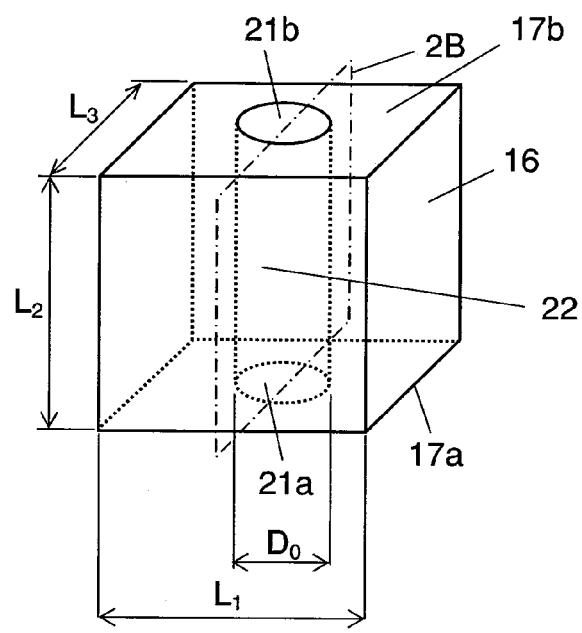
FIG. 2A is a perspective view of a cushioning member for use in the shock protection device of FIG. 1D.
Figure 2B:
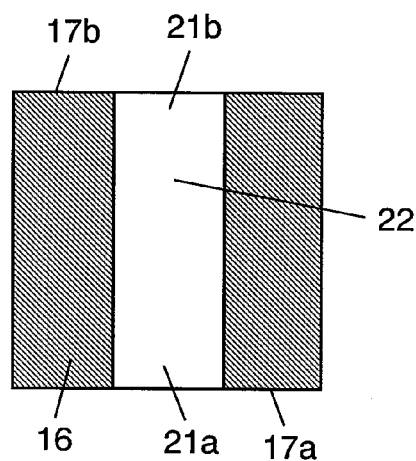
FIG. 2B is a sectional view showing a section taken on plane 2B of the cushioning member of FIG. 2A.
Figure 2C:
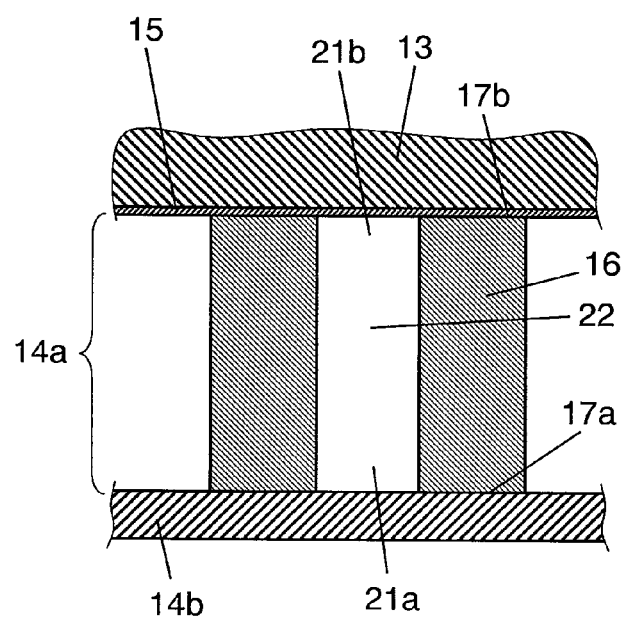
FIG. 2C is a partially sectional view showing a section taken on plane 2C of the shock protection device of FIG. 1D.

FIG. 1A is a perspective view of notebook personal computer 10 (hereinafter referred to as notebook PC 10) incorporating shock protection device 14 for hard disk drive 13 (hereinafter HDD 13) in accordance with the first exemplary embodiment of the present invention. FIG. 1B is a perspective view of HDD 13 and shock protection device 14 of FIG. 1A. FIG. 1C is a perspective view of shock protection device 14 of FIG. 1A. FIG. 1D is a perspective view of shock protection device 14 of FIG. 1A. FIG. 2A is a perspective view of cushioning member 16 for use in shock protection device 14 of FIG. 1D. FIG. 2B is a sectional view showing a section taken on plane 2B of cushioning member 16 of FIG. 2A. FIG. 2C is a partially sectional view showing a section taken on plane 2C of shock protection device 14 of FIG. 1D.

As shown from FIGS. 1A through 1D, notebook PC 10, i.e. portable information equipment, includes notebook PC body 11 and display 12. Notebook PC body 11 is a portable information equipment body that has some circuits including information processing circuits (not shown) therein. Display 12 has a liquid crystal panel (not shown) and some circuits including liquid crystal display circuits (not shown) therein. HDD 13 is covered by shock protection device 14 and housed in notebook PC 10. Shock protection device 14 includes inner case 14a and outer case 14b.

Inner case 14a is made of packaging material 15 and cushioning members 16. Packaging material 15 is made of a thin sheet material of resin. For packaging material 15, the sheet material is cut, bent, and formed into a shape having a space therein. Housed in an inside space of packaging material 15 is a device susceptible to a shock load, such as HDD 13, i.e. a device to be protected from shock by cushioning the shock load imposed thereon. Cushioning members 16 each shaped like substantially a rectangular parallelepiped are attached to packaging material 15 by double-sided adhesive tapes (not shown). Thus, inner case 14a is structured.

Cushioning members 16 include upper cushioning members 16u, lower cushioning members 16d, and side cushioning members 16s. Upper cushioning members 16u are disposed on a top face of shock protection device 14. Lower cushioning members 16d are disposed on a lower face of shock protection device 14. Side cushioning members 16s are disposed on side faces of shock protection device 14. Each of cushioning members 16 is made of a flexible material that has cushioning performance of undergoing compression deformation when being depressed. In other words, cushioning member 16 has elasticity and compresses to cushion a shock load when the shock load is imposed thereon. Preferably, cushioning member 16 is made of foamed resin material, gel material, or rubber material. The foamed resin material including polyurethane foam is preferable to use for cushioning member 16, because the shock-cushioning performance, i.e. an elastic coefficient and dumper constant, is preferable to use. Polyurethane foam is a material generally used in notebook PC 10 or a vehicle. As rubber material, special rubber having high shock-absorbing performance is preferable.

Generally, the shock-absorbing performance of cushioning member 16 is enhanced by increasing the volume of the foam used for cushioning member 16. For this reason, the weight of cushioning member 16 tends to increase. Thus, high shock-cushioning performance, and size and weight reduction are generally conflicting properties.

Generally, the phenomenon of cushioning a shock load is modeled using the following dynamic equation (1):

$$mx''+cx'+kx=0 \tag{1}$$

In dynamic equation (1), $x''$ represents the acceleration of an object, $x'$ represents the velocity of the object, x represents the displacement of the object, m represents the mass of the object, c represents the viscous damping coefficient of a viscous resistor, and k represents the spring constant of a spring component.

Cushioning member 16 using a foam material, such as resin foam, has both properties of a spring component and a viscous resistor. For this reason, it is preferable to use cushioning member 16 having spring constant k and viscous damping coefficient c appropriate for the application. In particular, at higher viscous damping coefficient c, shock energy is more easily consumed when a shock load is imposed on cushioning member 16.

However, it is difficult to create foam that has ideal properties of spring constant k and viscous damping coefficient c appropriate for the application. For this reason, the volume of the foam and the shape of the foam, such as the installation area, have conventionally been adjusted. However, creating the shape of foam exerting high shock-cushioning performance is difficult. When shapes made by combination of simple columns or rectangular parallelepipeds are used, sufficient shock-cushioning performance cannot be exerted.

Both inner case 14a and HDD 13 are housed in outer case 14b. Outer case 14b is a box-like case member made of a metal, such as aluminum. Shock protection device 14 is structured so that HDD 13 is housed in both inner case 14a and outer case 14b.

Shock protection device 14 thus structured houses a device to be protected from shock that is susceptible to a shock load, such as HDD 13, and is incorporated in notebook PC body 11. This structure protects HDD 13 from an extremely large shock load caused by a drop or the like. Further, HDD 13 is protected from small shock loads caused by daily actions, or frequently repeated vibration force.

Further, as shown in FIG. 2A, first opening 21a (hereinafter referred to as opening 21a) is formed in first plane 17a (hereinafter plane 17a) on one side of cushioning member 16. Second opening 21b (hereinafter opening 21b) is formed in second plane 17b (hereinafter plane 17b) on the opposite side of plane 17a. Air storage 22 (hereinafter storage 22), i.e. a hollow cavity, is formed to penetrate through opening 21a and opening 21b. Air is stored inside of storage 22. Storage 22 is not necessarily limited to a structure penetrating from opening 21a to opening 21b.

Further, preferably, pores of continuously linked cells (not shown) are provided in cushioning member 16. The pores provided in cushioning member 16 allow the air stored in storage 22 to flow out of storage 22 therethrough.

Cushioning member 16 is shaped like substantially a rectangular parallelepiped before undergoing compression deformation. However, cushioning member 16 may have a cylindrical shape. Further, cushioning member 16 may have another columnar shape having a polygonal section, such as a pentagonal prism and hexagonal prism. In other words, the cushioning member has a three-dimensional shape including at least one plane 17a. When storage 22 is provided to penetrate through cushioning member 16, cushioning member 16 may have a three-dimensional shape including at least a pair of planes 17a and 17b faced with each other. The shape of openings 21a and 21b may be a polygon, e.g. a triangle and quadrangle, a star, and a cross, other than a circular shape of FIG. 2A, so that the openings fit the shape of cushioning member 16.

Attaching plane 17b to packaging material 15 using a double-sided adhesive tape brings opening 21b forming one side of storage 22 into intimate contact with the surface of packaging material 15, thereby blocking storage 22. At this time, outer case 14b and plane 17a are brought into intimate contact with each other. However, outer case 14b and plane 17a are not hermetically fixed.

Hereinafter, using lower cushioning member 16d as an example of cushioning member 16 of the present invention, a description is provided of the cushioning action of shock protection device 14 to HDD 13, with reference to FIGS. 3A through 3C.

Figure 3A:
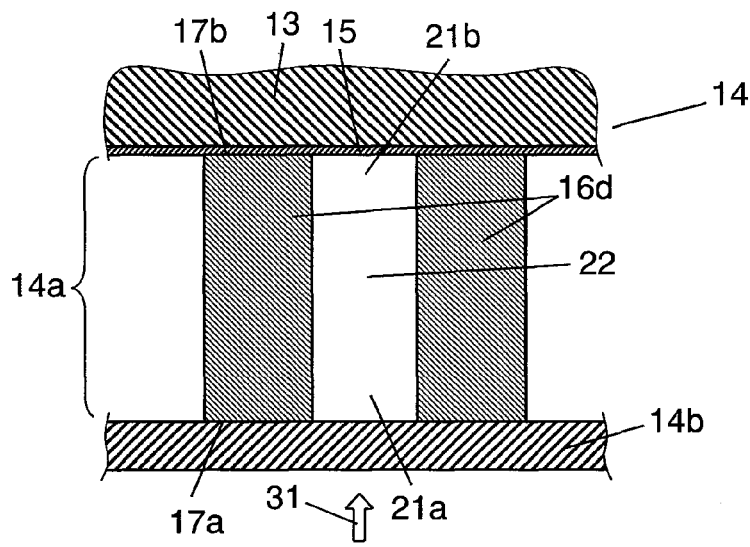
FIG. 3A is a diagram illustrating cushioning action of a shock protection device that houses a HDD.
Figure 3B:
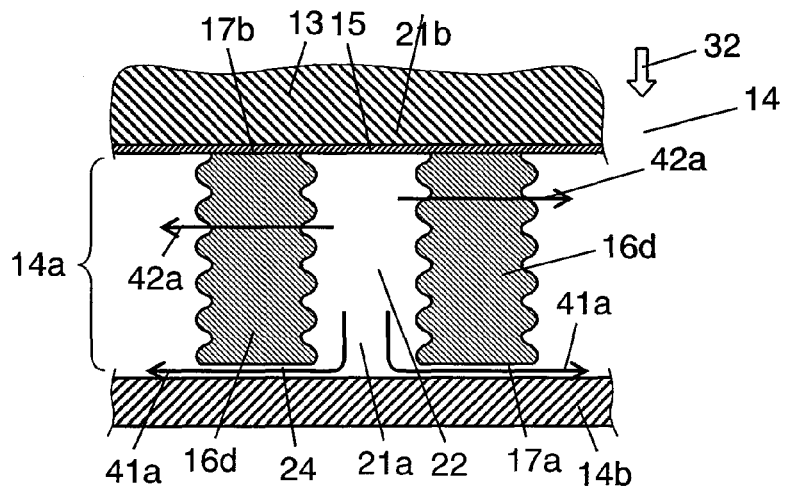
FIG. 3B is a diagram illustrating the cushioning action of the shock protection device that houses the HDD.
Figure 3C:
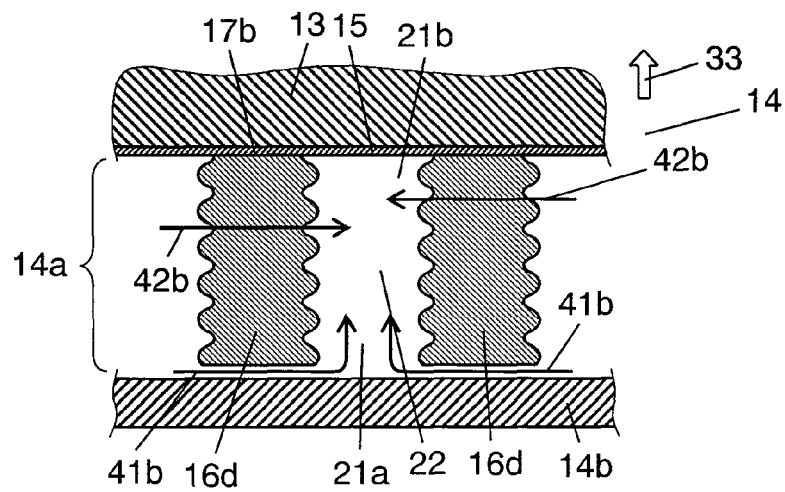
FIG. 3C is a diagram illustrating the cushioning action of the shock protection device that houses the HDD.

FIGS. 3A through 3C are diagrams each illustrating the cushioning action when a large shock load is imposed on shock protection device 14, that houses HDD 13, from the downward direction thereof. The large shock load is imposed on shock protection device 14 when a user thereof inadvertently drops notebook PC 10, for example.

As shown in FIG. 3A, first, a shock load is imposed on HDD 13 via outer case 14b from the downward direction (shown by arrow 31) thereof. As shown in FIG. 3B, lower cushioning member 16d undergoes compression deformation in the direction of shock (shown by arrow 32), depending on the weight of HDD 13. At this time, storage 22 also undergoes compression deformation, and the air in storage 22 is compressed. This phenomenon increases the air pressure inside of storage 22.

The increase in the air pressure inside of storage 22 deforms plane 17a, and forms gap 24 in the contact portion between outer case 14b and plane 17a in intimate contact with each other. The magnitude of the increase in the air pressure inside of storage 22 depends on the air-tightness of gap 24 between plane 17a and outer case 14b and the air-permeability of the material of lower cushioning member 16d. In other words, as a result of the increase in the air pressure inside of storage 22, a part of the pressurized air flows out of storage 22 through gap 24 along arrow 41a. Further, a part of the pressurized air flows out of storage 22 through the pores in lower cushioning member 16b along arrow 42a. At this time, viscose resistance to air flows (arrows 41a and 42a) is generated. This resistance hinders the compression deformation of lower cushioning member 16d, and absorbs the shock energy given to HDD 13.

In other words, when lower cushioning member 16d undergoes compression deformation, the viscose resistance to the air outflows hinders the compression deformation of lower cushioning member 16d. In this manner, lower cushioning member 16d bears the shock load, and the viscose resistance of lower cushioning member 16d consumes the shock energy. As a result, the shock-cushioning effect of lower cushioning member 16d is increased. Generally, a viscose resistor consumes more shock energy at a higher velocity of the air outflow. In other words, the viscose resistor provided in lower cushioning member 16d can exert higher shock-energy consuming effect and higher shock-cushioning effect by using the high velocity of the air outflow in the initial stage when a shock load is imposed on lower cushioning member 16d.

After having absorbed the shock load, as shown in FIG. 3C, lower cushioning member 16d is swollen in the direction shown by arrow 33 to the state before the shock load is imposed on the member, by the restoring force the property of the material of lower cushioning member 16d originally has. When the shape of lower cushioning member 16d restores to the original state thereof, air flows into depressurized storage 22 along arrow 41b through gap 24. Similarly, air flows into storage 22 through the pores in lower cushioning member 16d along arrow 42b. Lower cushioning member 16d restores more gently and slowly than the member bears the shock load.

FIG. 4 is a graph showing measurement data on a shock load borne by HDD 13 resulting from a shock load imposed on outer case 14b.

The measurement results of FIG. 4 show the measurement data when foam is used as cushioning member 16. FIG. 4 shows the measurement data on a shock load borne by the HDD when the same shock load is imposed on outer case 14b including one of cushioning member 16 and a conventional cushioning member. As shown in FIG. 4, when cushioning member 16 is used, the shock load imposed on HDD 13 is smaller than the case in which the conventional cushioning member is used. In other words, when cushioning member 16 of the present invention is used, the shock load imposed on HDD 13 is approximately 30% smaller than that in the case in which the conventional cushioning member is used. In this manner, for the cushioning performance, cushioning member 16 of the present invention can provide more excellent cushioning effect than the conventional cushioning member.

As described above, in the first exemplary embodiment, shock protection device 14 of the present invention has storage 22 in cushioning member 16 constituting shock protection device 14. With this structure, the outflow of the air inside of storage 22 promotes consumption of the shock energy, and gives cushioning member 16 the capability of the viscose resistor. This structure can provide cushioning member 16 and shock protection device 14 having high shock-cushioning effect. Thus, this structure can reduce the number of components and the costs, and further cushioning member 16 and shock protection device 14 having a simple structure. These advantages provide shock protection device 14 that has a simplified mass production method including assembly thereof. Further, these advantages also contribute to size and weight reduction of shock protection device 14, thus providing cushioning member 16 and shock protection device 14 appropriate for application to portable information equipment requiring size and weight reduction, such as notebook PC 10.

With reference to FIGS. 3A through 3C, lower cushioning member 16d is described as an example of cushioning member 16. However, the same action and advantage are exerted when the present invention is used for upper cushioning member 16u against a shock load on the top face of HDD 13, and for side cushioning member 16c against a shock load on the side face thereof.

In the description, the compressed air inside of storage 22 flows out through the micro-pores originally provided in cushioning member 16. However, for the pores, a plurality of through-holes penetrating from the inside wall surface of storage 22 to the outside wall surface of cushioning member 16 may artificially be formed using a fine needle or needlelike jig. In this case, preferably, the through-holes are formed uniformly over the wall surface.

About the shape of cushioning member 16, for example, a width $L_1=20$ mm, a height $L_2=15$ mm, and a depth $L_3=15$ mm are preferable. As for a diameter of opening 21a, for example, $D_0=6$ mm is preferable. In other words, volume rate of storage 22 compared with a volume of cushioning member 16 is around 9.4%. Further, about a characteristic of material used for cushioning member 16, for example, it is preferably that a repulsion force is 11.3 kPa when cushioning member 16 is compressed until the condition of 50% as the hardness. About the cell rate (a ratio of the pore), it is almost preferable air/materials=94/6, for example. Meanwhile, the shape of cushioning member 16, and the characteristic of material used for cushioning member 16 are not limited to the described above.

Second Exemplary Embodiment

FIGS. 5A through 8F show different modifications of for use in shock protection device 14 for HDD 13 in accordance with the second exemplary embodiment of the present invention.

Figure 5A:
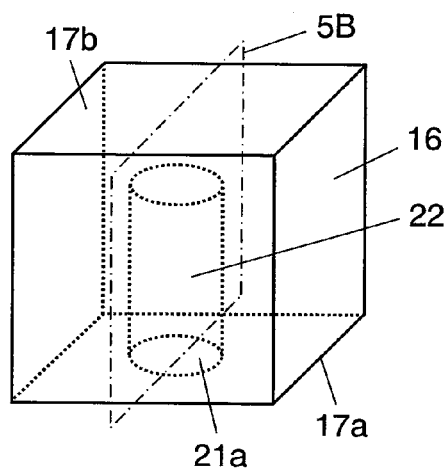
FIG. 5A is a perspective view of another modification of the cushioning member for use in the shock protection device of FIG. 1D.
Figure 5B:
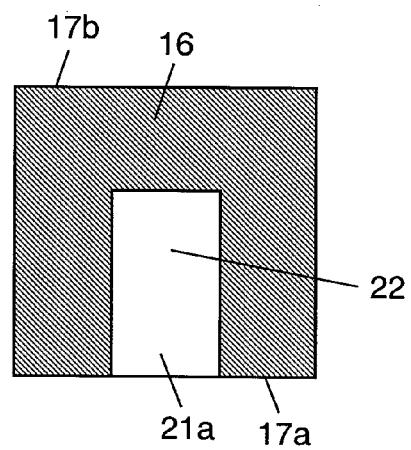
FIG. 5B is a sectional view showing a section taken on plane 5B of the cushioning member of FIG. 5A.
Figure 6A:
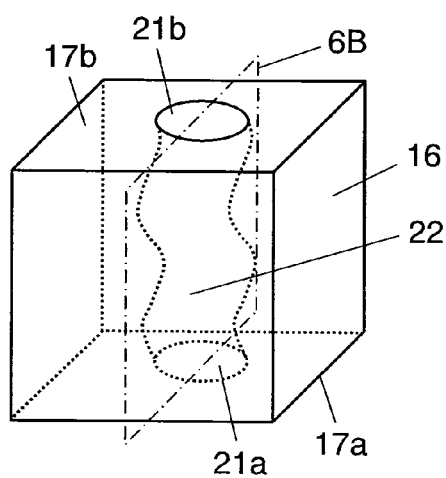
FIG. 6A is a perspective view of yet another modification of the cushioning member for use in the shock protection device of FIG. 1D.
Figure 6B:
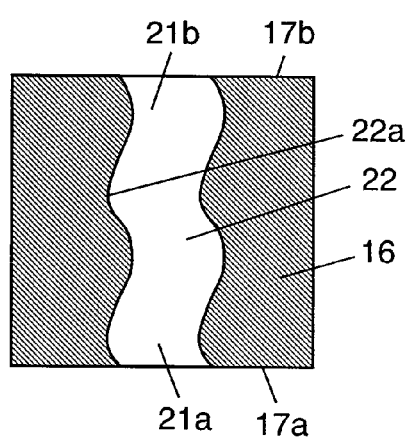
FIG. 6B is a sectional view showing a section taken on plane 6B of the cushioning member of FIG. 6A.
Figure 7A:
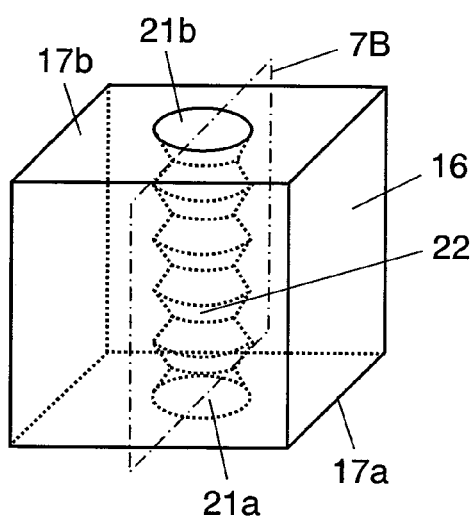
FIG. 7A is a perspective view of still another modification of the cushioning member for use in the shock protection device of FIG. 1D.
Figure 7B:
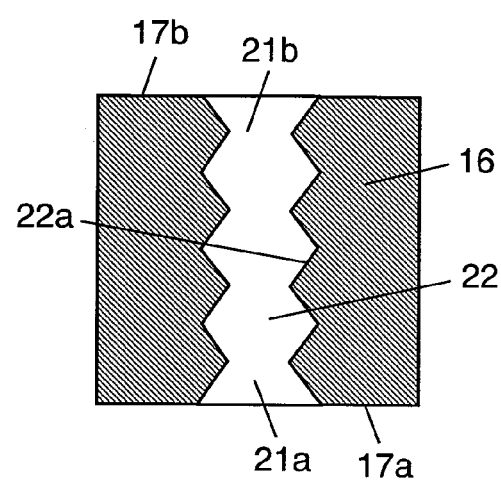
FIG. 7B is a sectional view showing a section taken on plane 7B of the cushioning member of FIG. 7A.
Figure 8A:
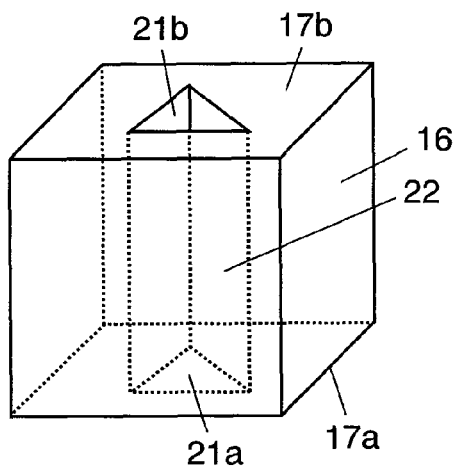
FIG. 8A is a perspective view of still another modification of the cushioning member for use in the shock protection device of FIG. 1D.
Figure 8B:
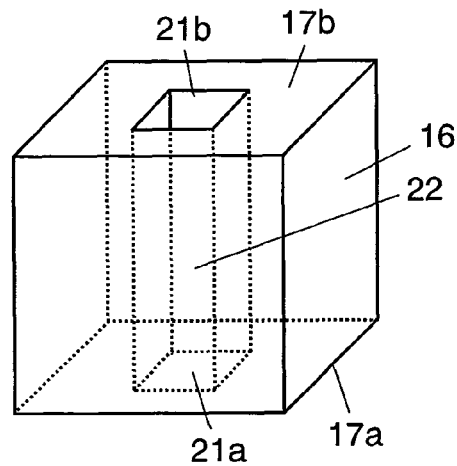
FIG. 8B is a perspective view of yet another modification of the cushioning member for use in the shock protection device of FIG. 1D.
Figure 8C:
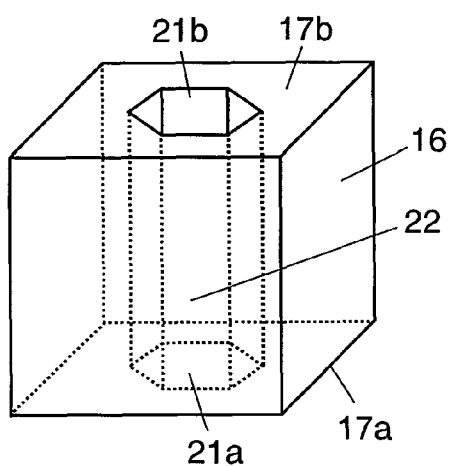
FIG. 8C is a perspective view of still another modification of the cushioning member for use in the shock protection device of FIG. 1D.
Figure 8D:
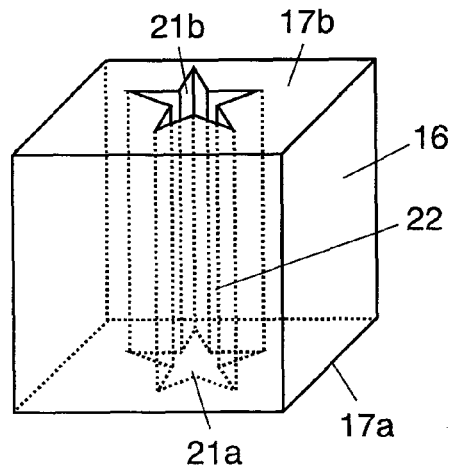
FIG. 8D is a perspective view of yet another modification of the cushioning member for use in the shock protection device of FIG. 1D.
Figure 8E:
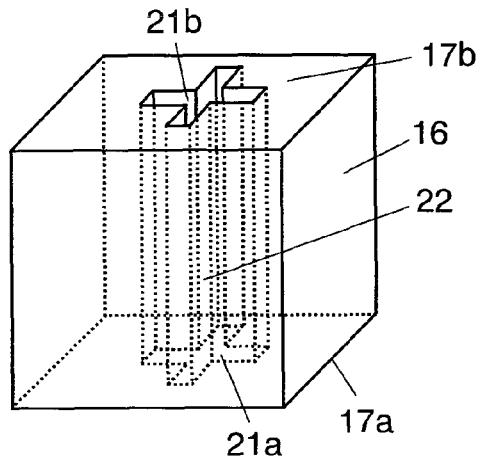
FIG. 8E is a perspective view of still another modification of the cushioning member for use in the shock protection device of FIG. 1D.
Figure 8F:
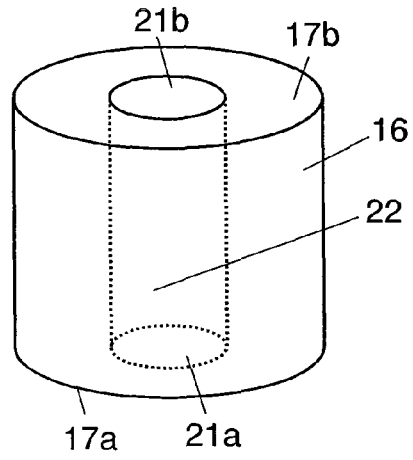
FIG. 8F is a perspective view of yet another modification of the cushioning member for use in the shock protection device of FIG. 1D.
Figure 9A:
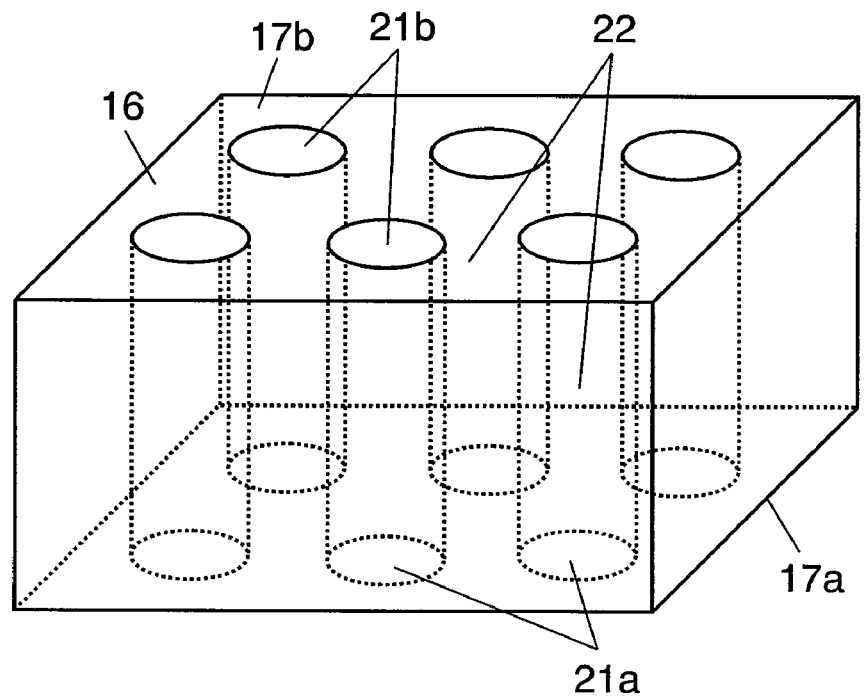
FIG. 9A is a perspective view of still another modification of the cushioning member for use in the shock protection device of FIG. 1D.
Figure 9B:
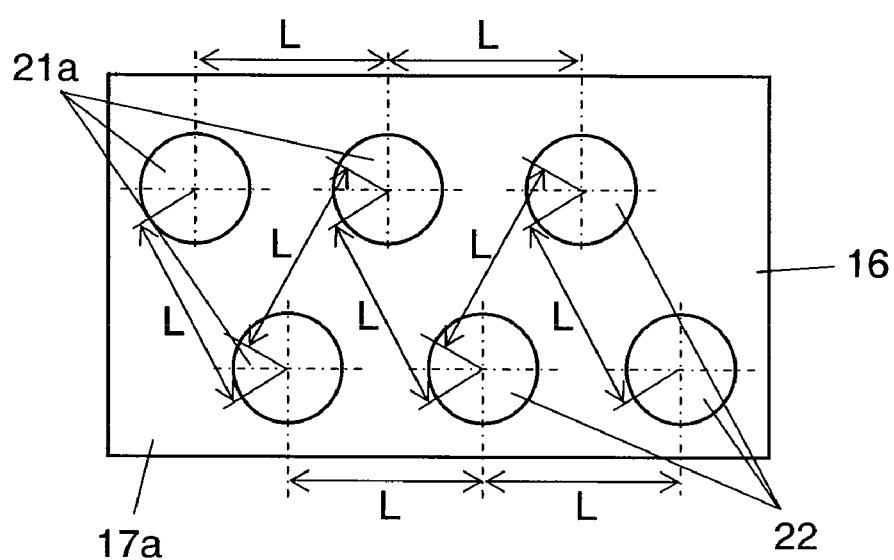
FIG. 9B is a plan view of yet another modification of the cushioning member for use in the shock protection device of FIG. 1D.

FIG. 5A is a perspective view of another modification of cushioning member 16 for use in shock protection device 14 of FIG. 1D. FIG. 5B is a sectional view showing a section taken on plane 5B of cushioning member 16 of FIG. 5A. Further, FIG. 6A is a perspective view of another modification of cushioning member 16 for use in shock protection device 14 of FIG. 1D. FIG. 6B is a sectional view showing a section taken on plane 6B of cushioning member 16 of FIG. 6A. Further, FIG. 7A is a perspective view of yet another modification of cushioning member 16 for use in shock protection device 14 of FIG. 1D. FIG. 7B is a sectional view showing a section taken on plane 7B of cushioning member 16 of FIG. 7A. Each of FIGS. 8A through 8F is a perspective view of still another modification of cushioning member 16 for use in shock protection device 14 of FIG. 1D, also. FIG. 9A is a perspective view of still another modification of cushioning member 16 for use in shock protection device 14 of FIG. 1D. FIG. 9B is a plan view of yet another modification of cushioning member 16 for use in shock protection device 14 of FIG. 1D.

Unlike cushioning member 16 of FIG. 2A, cushioning member 16 shown in FIGS. 5A and 5B includes storage 22 that has opening 21a opened to plane 17a but no opening 21b opened to plane 17b. In other words, storage 22 does not necessarily penetrate from opening 21a on the side of plane 17a, to plane 17b. Therefore, in cushioning member 16, plane 17a including one opening 21a is in contact with outer case 14b, and plane 17b including no opening on the opposite side is attached to packaging material 15 using a double-sided adhesive tape to form inner case 14a. Even this structure can provide the same action and advantage. In other words, cushioning member 16 may have a three-dimensional shape including at least one plane 17a.

Further, cushioning member 16 may have a hollow shape and a shape of inside wall surface 22a shown in FIGS. 6A through 7B. As shown in FIGS. 6A through 7B, inside wall surface 22a of storage 22 has non-uniform projections and depressions formed at random. The viscose resistance of cushioning member 16 is easily varied by adjusting the degree (difference in height between a top of the projections and a bottom of the depressions) and number of the projections and the depressions. When the viscose resistance of cushioning member 16 is variable, further improvement in the cushioning performance or durability of cushioning member 16 can be expected, according to the characteristics of the viscose resistance to be selected.

Further, as shown in FIGS. 8A through 8E, the sectional shape of storage 22 and the shape of openings 21a and 21b may be a polygon, such as a triangle, quadrangle, and hexagon, a star, or a cross, other than the circle. The sectional shape of storage 22 and the shape of openings 21a and 21b do not have geometrical similarity necessarily. Though not shown, the sectional shape of storage 22 may be a quadrangle and the shape of openings 21a and 21b may be the circle.

In the above description, cushioning member 16 is a flexible material having substantially the rectangular parallelepiped shape before undergoing compression deformation. However, as shown in FIG. 8F, an outer shape of cushioning member 16 may be cylindrical. Though not shown, the outer shape of cushioning member 16 may be another columnar shape. According to the shape of cushioning member 16, the sectional shape of storage 22 and the shape of openings 21a and 21b may be the circle, polygon, or star.

Alternatively, as shown in FIG. 9A, cushioning member 16 may have a plurality of storages 22 formed therein. When a plurality of storages 22 are formed in cushioning member 16, preferably, the distances between adjacent storages 22 are equal. Further, when a plurality of storages 22 are formed in cushioning member 16 as shown in FIG. 9B, preferably, distances L between centers of adjacent openings 21a and 21b of the plurality of storages 22 are equal. Forming a plurality of storages 22 uniformly in cushioning member 16 in this manner allows the shock load imposed on cushioning member 16 to be exerted over plane 17a of cushioning member 16 uniformly. Thus, the shock energy is absorbed smoothly.

Third Exemplary Embodiment

Figure 10A:
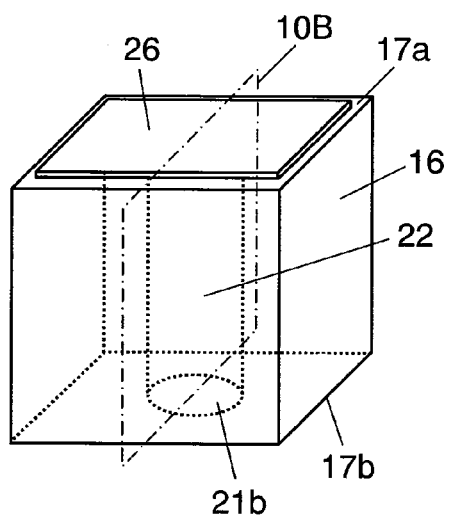
FIG. 10A is a perspective view of a cushioning member for use in a shock protection device for a HDD in accordance with a third exemplary embodiment.
Figure 10B:
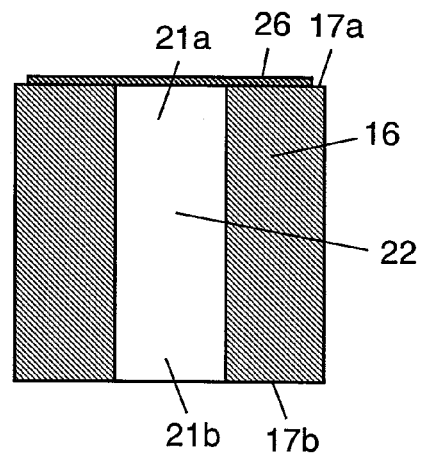
FIG. 10B is a sectional view showing a section taken on plane 10B of the cushioning member of FIG. 10A.
Figure 10C:
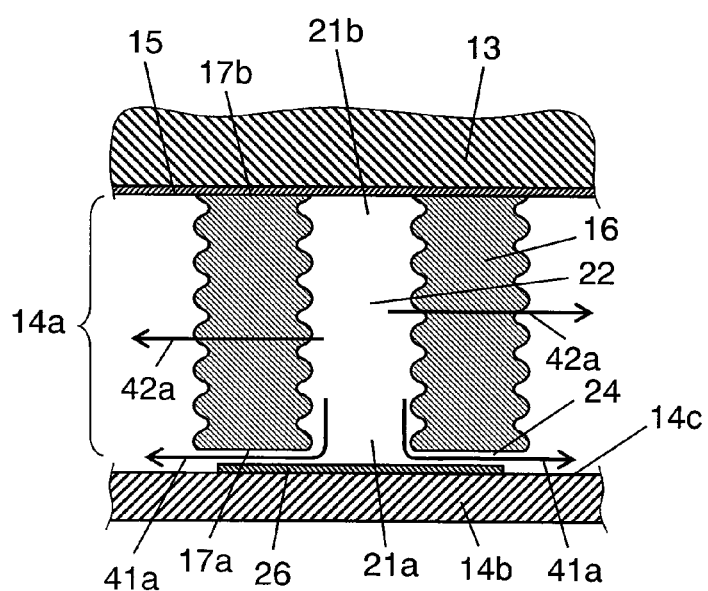
FIG. 10C is a partially sectional view of the cushioning member of FIG. 10A, when the cushioning member is used for the shock protection device of FIG. 1D and bears a shock load.
Figure 11A:
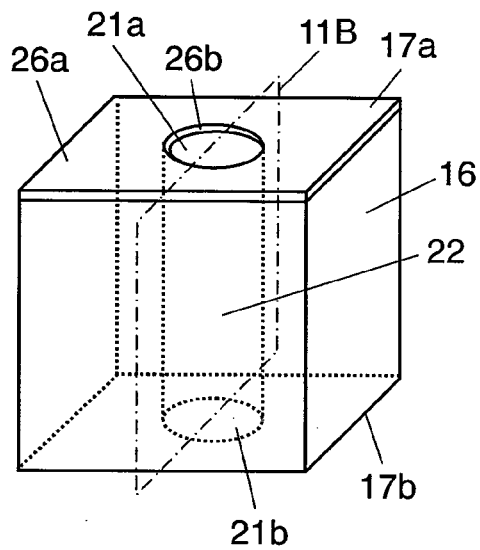
FIG. 11A is a perspective view of another modification of the cushioning member for use in the shock protection device for the HDD in accordance with the third exemplary embodiment.
Figure 11B:
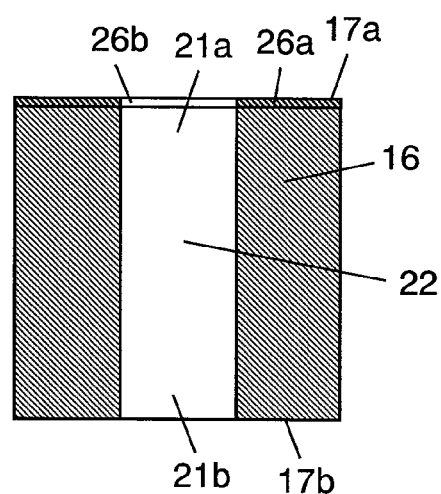
FIG. 11B is a sectional view showing a section taken on plane 11B of the cushioning member of FIG. 11A.
Figure 11C:
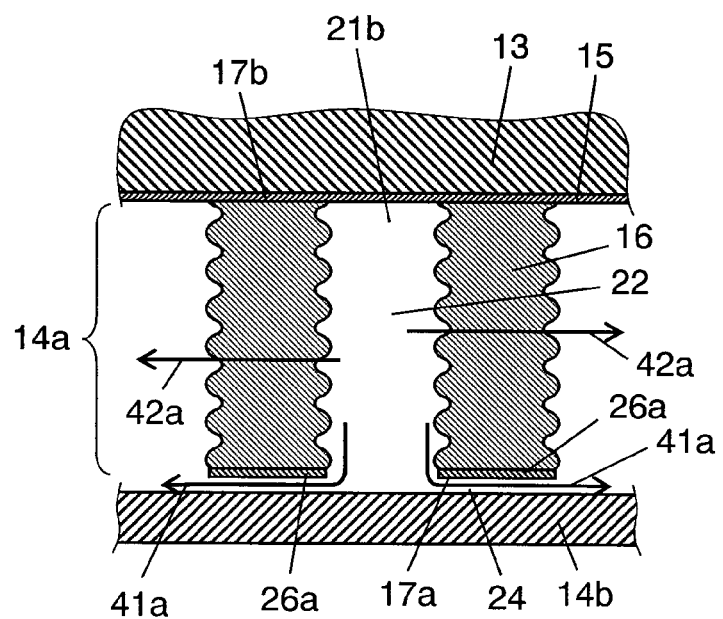
FIG. 11C is a partially sectional view of the cushioning member of FIG. 11A, when the cushioning member is used for the shock protection device of FIG. 1D and bears a shock load.

FIG. 10A is a perspective view of cushioning member 16 for use in shock protection device 14 for HDD 13 in accordance with the third exemplary embodiment. FIG. 10B is a sectional view showing a section taken on plane 10B of cushioning member 16 of FIG. 10A. FIG. 10C is a sectional view of cushioning member 16 of FIG. 10A, when cushioning member 16 is used for shock protection device 14 of FIG. 1D and bears a shock load. FIG. 11A is a perspective view of another modification of cushioning member 16 for use in shock protection device 14 for HDD 13 in accordance with the third exemplary embodiment. FIG. 11B is a sectional view showing a section taken on plane 11B of cushioning member 16 of FIG. 11A. FIG. 11C is a sectional view of cushioning member 16 of FIG. 11A, when cushioning member 16 is used for shock protection device 14 of FIG. 1D and bears a shock load.

As shown in FIGS. 10A and 10B, lid 26 is disposed to cover opening 21 of cushioning member 16. Preferably, lid 26 is made of a sheet-type resin. Lid 26 is easily attached to the cushioning member 16 using a double-sided adhesive tape (not shown), for example. When lid 26 is attached to cushioning member 16, preferably, opening 21a is not completely sealed with a double-sided adhesive tape, and is attached thereto with fixation force in a degree to which the air can flow out of storage 22 and lid 26 is not displaced.

Outer case 14b is a box-shaped case member made of a metal, such as aluminum. Therefore, depending on how outer case 14b is worked in shaping, surface 14c of outer case 14b is not always finished in the same condition. For this reason, cushioning member 16 is not always in stable contact with outer case 14b. However, when lid 26 is disposed, lid 26 makes intimate contact with plane 17a and enhances the air-tightness of opening 21a. This structure allows the capability imparted to cushioning member 16 as a viscose resistor to be exerted in a stable manner.

Hereinafter, a description is provided of the cushioning action of cushioning member 16 and shock protection device 14 in accordance with the third exemplary embodiment of the present invention, with reference to FIG. 10C.

When a shock load is imposed on cushioning member 16 via outer case 14b, cushioning member 16 and storage 22 undergo compression deformation. A part of the compressed air inside of storage 22 flows out of storage 22 through gap 24 formed between opening 21a of storage 22 and lid 26 in contact with cushioning member 16.

In the third exemplary embodiment, lid 26 is disposed between opening 21a of cushioning member 16 and outer case 14b. Thus, the contact state between cushioning member 16 and lid 26 is kept constant. With this structure, the viscose resistance to the flow of the compressed air inside of storage 22 can be kept constant irrespective of how outer case 14b is finished in shaping. As a result, cushioning member 16 and shock protection device 14 have stable cushioning performance.

Lid 26 needs not cover opening 21a completely, or be disposed on opening 21a in intimate contact therewith. In other words, the characteristics of cushioning member 16 as a viscose resistor can be adjusted by changing the degree to which opening 21a is sealed using lid 26 and a double-sided adhesive tape, i.e. intentional displacement of lid 26, and variations in the amount and position of the double-sided adhesive tape.

As described above, in accordance with the third exemplary embodiment, lid 26 covering opening 21a is provided on cushioning member 16 including storage 22. When a shock load is imposed on cushioning member 16, this structure keeps the viscose resistance thereof constant, thus providing stable cushioning performance. Further, the characteristics of cushioning member 16 as a viscose resistor can easily be adjusted.

Lid 26 may have air permeability and a hole penetrating through lid 26. Further, lid 26 may be made of foam having different properties from cushioning member 16.

Further, lid 26 is not only applied to cushioning member 16 shown in FIG. 10A that is shaped as substantially a perpendicular parallelepiped including cylindrical storage 22 therein, but also to the above various modifications of cushioning member 16.

Alternatively, as shown in FIGS. 9A and 9B, for cushioning member 16 having a plurality of storages 22 formed therein, lid 26 may cover all the openings 21a. A structure in which the sheet material forming constituting lid 26 is cut as appropriate to selectively cover openings 21a can further extend the adjustment range of the viscose resistance of cushioning member 16.

Alternatively, as shown in FIG. 11A, lid 26a may have opening 26b in a position corresponding to opening 21a. When lid 26a has opening 26b, the entire surface of lid 26a is attached to cushioning member 16 using a double-sided adhesive tape (not shown), so that first plane 17a of cushioning member 16 is structured of lid 26a. In the structure of cushioning member 16 shown in FIGS. 11A and 11B, the shock load imposed on cushioning member 16 forms gap 24 between lid 26a and outer case 14b, as shown in FIG. 11C. Adjustment of properties of lid 26a, such as a thickness, hardness, and surface roughness, can easily adjust the characteristics of cushioning member 16 as a viscose resistor against the flow of the compressed air.

Fourth Exemplary Embodiment

Figure 12A:
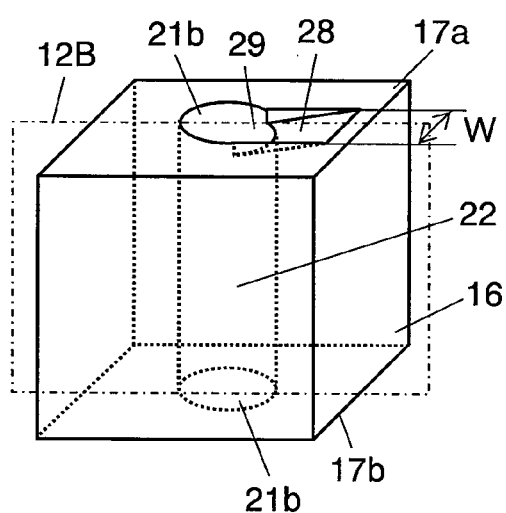
FIG. 12A is a perspective view of a cushioning member for use in a shock protection device for a HDD in accordance with a fourth exemplary embodiment.
Figure 12B:
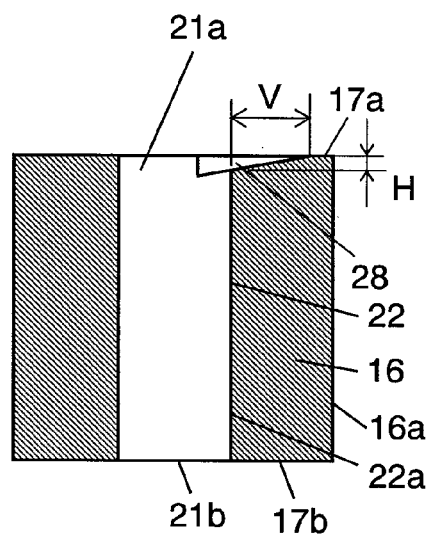
FIG. 12B is a sectional view showing a section taken on plane 12B of the cushioning member of FIG. 12A.
Figure 12C:
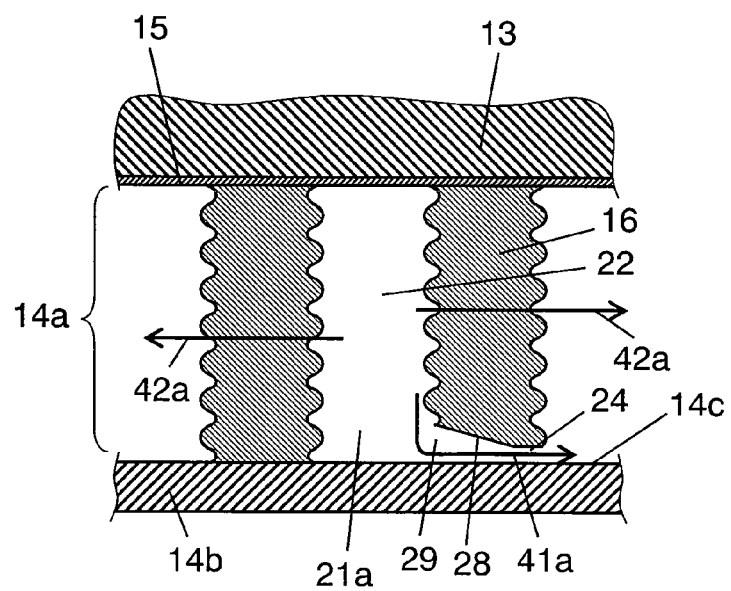
FIG. 12C is a partially sectional view of the cushioning member of FIG. 12A, when the cushioning member is used for the shock protection device of FIG. 1D and bears a shock load.
Figure 13A:
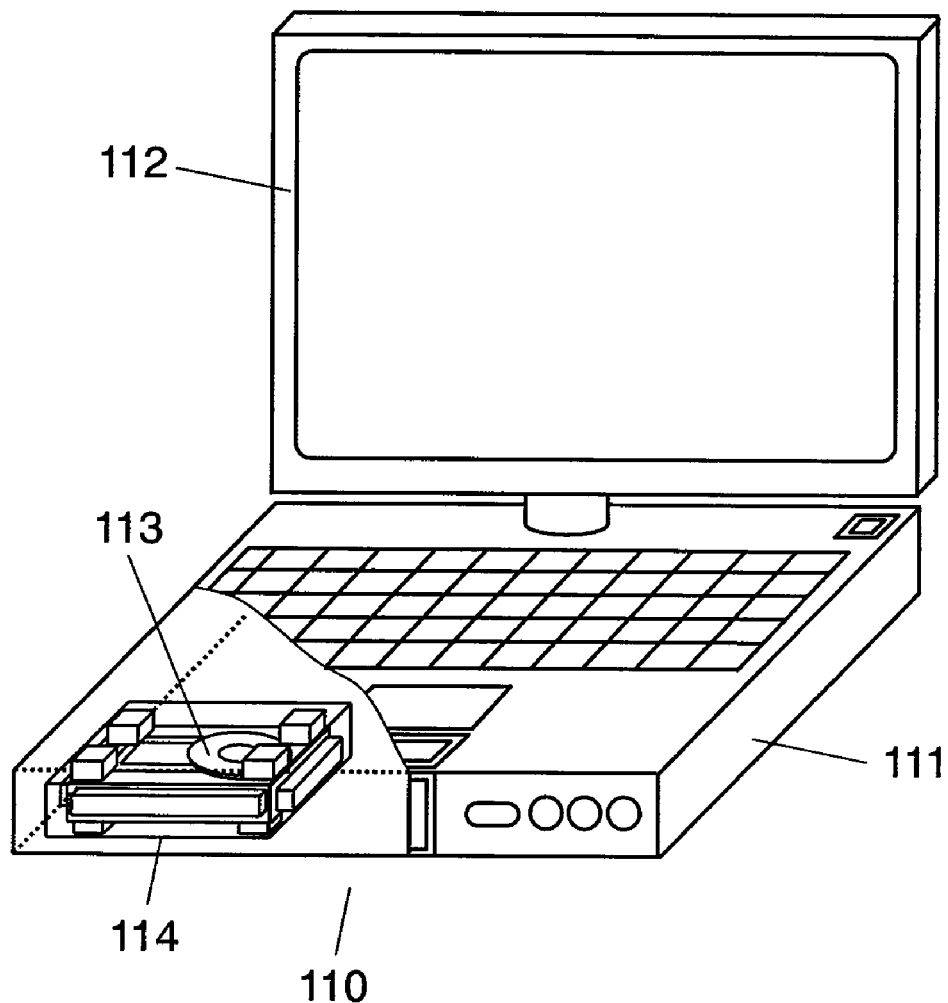
FIG. 13A is a perspective view of a notebook PC incorporating a conventional shock protection device for a hard disk drive (HDD).
Figure 13B:
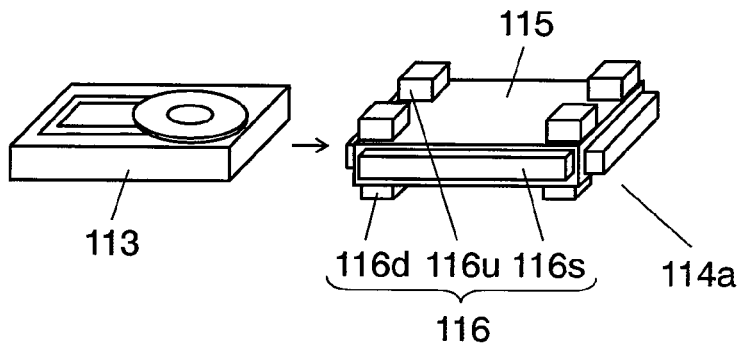
FIG. 13B is a perspective view of the HDD and the shock protection device of FIG. 13A.
Figure 13C:
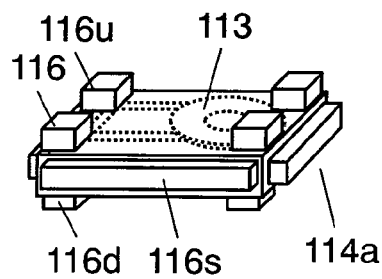
FIG. 13C is a perspective view of the shock protection device of FIG. 13A.
Figure 13D:
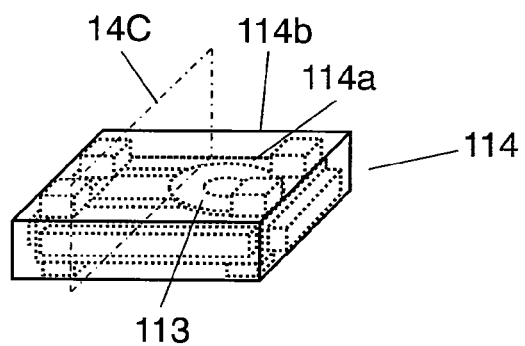
FIG. 13D is a perspective view of the shock protection device of FIG. 13A.
Figure 14A:
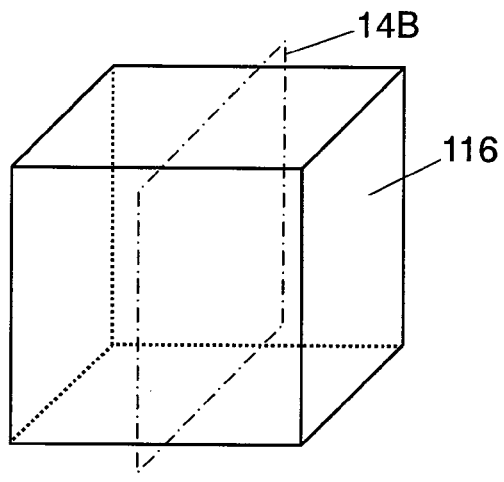
FIG. 14A is a perspective view of a cushioning member for use in the shock protection device of FIG. 13D.
Figure 14B:
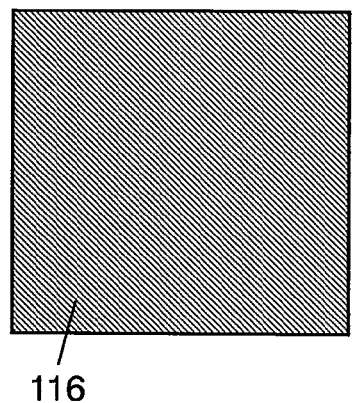
FIG. 14B is a sectional view showing a section taken on plane 14B of the cushioning member of FIG. 14A.
Figure 14C:
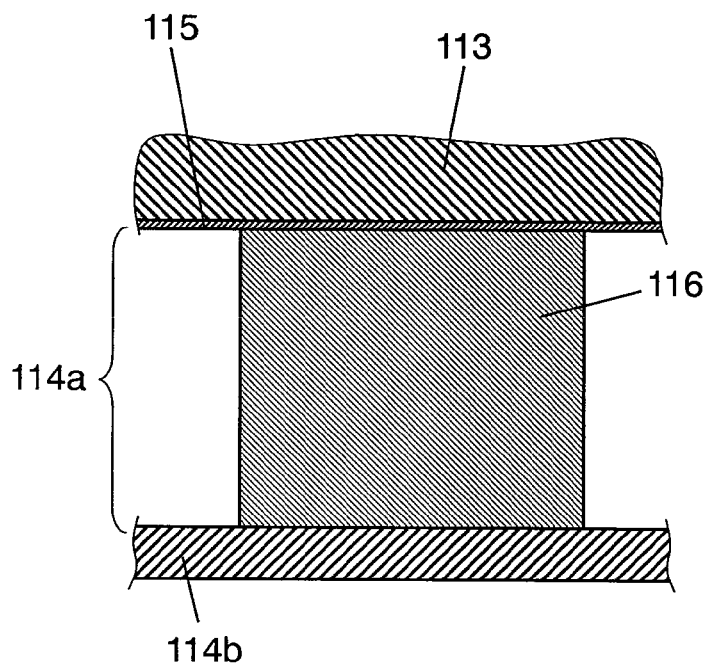
FIG. 14C is a partially sectional view showing a section taken on plane 14C of the cushioning member of FIG. 13D.

FIG. 12A is a perspective view of cushioning member 16 for use in shock protection device 14 for HDD 13 in accordance with the fourth exemplary embodiment. FIG. 12B is a sectional view showing a section taken on plane 12B of cushioning member 16 of FIG. 12A. FIG. 12C is a sectional view of cushioning member 16 of FIG. 12A, when cushioning member 16 is used for shock protection device 14 of FIG. 1D and bears a shock load.

Notch 28 is provided in plane 17a. Notch 28 has a space that becomes narrower from inside wall surface 22a of storage 22 adjacent to opening 21a of cushioning member 16 toward outside wall surface 16a of cushioning member 16. The sectional shape of notch 28 is a wedge shape. The sectional shape of notch 28 in a sectional plane perpendicular to sectional plane 12B is substantially a rectangle.

Outer case 14b is a box-shaped case member made of a metal, such as aluminum. Therefore, depending on how outer case 14b is worked in shaping, surface 14c of outer case 14b is not always finished in the same condition. For this reason, how cushioning member 16 is in contact with outer case 14b is not always stable. However, when the air pressure inside of storage 22 is increased by the shock load imposed on cushioning member 16, notch 28 guides the air to stabilize the flow channel of the compressed air.

Hereinafter, a description is provided of the cushioning action of cushioning member 16 and shock protection device 14 in accordance with the fourth exemplary embodiment of the present invention, with reference to FIG. 12C.

When the shock load is imposed on cushioning member 16 via outer case 14b, cushioning member 16 and storage 22 undergo compression deformation. A part of the compressed air inside of storage 22 flows out of storage 22 through gap 24 between opening 21a of storage 22 and outer case 14b in contact with cushioning member 16.

In the fourth exemplary embodiment, notch 28 is formed near opening 21a of cushioning member 16. This structure guides the part of the compressed air inside of storage 22 to opening 29 of notch 28 and ensures the flow channel of the compressed air. In other words, notch 28 works to stabilize the airflow. The part of the compressed air guided into opening 29 passes through the space between notch 28 and outer case 14b and then thorough narrow gap 24 in the outer portion without notch 28, and flows out of storage 22. Gap 24 is formed by deformation of cushioning member 16 caused by the pressure of the compressed air. With this structure, the viscose resistance to the flow of the compressed air inside of storage 22 can be kept constant irrespective of how surface 14c of outer case 14b is finished in shaping. As a result, cushioning member 16 and shock protection device 14 have stable cushioning performance.

After having absorbed the shock load, cushioning member 16 is restored to the state before the shock load is imposed on the member, by the restoring force the property of the material of cushioning member 16 originally has. When the shape of cushioning member 16 is restored to the original state thereof, air flows into storage 22 through gap 24. Similarly, air flows into storage 22 through the pores in cushioning member 16. Cushioning member 16 restores more gently and slowly than the member bears the shock load. When the air flows into storage 22 through gap 24, notch 28 works as a valve. With this structure, the air flows into the storage through the channel different from the outflow channel. Cushioning member 16 restores more gently than the member bears the shock load.

Further, adjusting notch width W, notch length V, and notch height H of notch 28 allows easy adjustment of the characteristics of cushioning member 16 as the viscose resistor against the flow of the compressed air.

As described above, in accordance with the fourth exemplary embodiment, cushioning member 16 including storage 22 has notch 28 formed near opening 21a of storage 22. This structure keeps the viscose resistance of cushioning member 16 and provides stable shock-cushioning performance when the shock load is imposed on the member. Further, the characteristics of cushioning member 16 as the viscose resistor are easily adjusted.

What is claimed is:

1. A shock protection device comprising:
   a packaging material formed of a sheet for housing a device to be protected from shock so that the packaging material encloses the device;
   a cushioning member including a first outer surface and a second outer surface opposing the first outer surface, the cushioning member having an opening extending from the first outer surface to the second outer surface, the first outer surface of the cushioning member attached to an outer surface of the packaging material;
   and
   an outer case member,
   the packaging material and the cushioning member within the outer case member, the second outer surface of the cushioning member in contact with an inner surface of the outer case member prior to the case member receiving a shock load,
   wherein,
   the packaging material, the opening and the outer case form a blocked air storage, and
   responsive to the shock load on the outer case member, the cushioning member compresses and air in the air storage flows out from a gap where the cushioning member was in contact with the inner surface of the outer case member.

2. The shock protection device of claim 1, wherein
   the cushioning member has a three-dimensional shape including a second outer surface facing the first outer surface; and
   the air storage is a cavity penetrating from the first outer surface to the second outer surface.

3. The shock protection device of claim 1, wherein
   the cushioning member has a plurality of pores penetrating from an inside wall surface of the opening to an outside wall surface of the cushioning member; and
   when the shock load is imposed on the cushioning member, air in the air storage is compressed, and a part of the compressed air flows out of the air storage through the pores.

4. The shock protection device of claim 1, wherein
   an inside wall surface of the air storage has projections and depressions formed at random.

5. The shock protection device of claim 1, wherein
   a shape of the opening is one of a circle, a triangle, a quadrangle, a polygon, a star, and a cross.

6. The shock protection device of claim 1, wherein
   the cushioning member includes the plurality of air storages, and distances between adjacent air storages are equal to each other.

7. The shock protection device of claim 6, wherein
   distances between centers of openings of adjacent air storages are equal to each other.

8. The shock protection device of claim 6, further comprising:
   a sheet-type lid for covering all the openings of the air storages or covering ones of the openings selectively.

9. The shock protection device of claim 1, further comprising:
   a sheet-type lid for covering the opening.

10. The shock protection device of claim 1, further comprising:
    a notch which is formed in a first outer surface and has a space becoming narrower from an inside wall surface of the air storage toward an outside wall surface of the cushioning member.

11. The shock protection device of claim 1, wherein
    the cushioning member is made of one of resin foam material, gel material, and rubber material.

12. The shock protection device of claim 1, wherein
    the sheet has a substantially rectangular parallelepiped shape, and
    the cushioning member is attached to the sheet on an upper face, a lower face, and a side face of the sheet.

* * * * *